US012794505B2

(12) United States Patent
Yuan

(10) Patent No.: US 12,794,505 B2
(45) Date of Patent: Nov. 10, 2026

(54) WIRELESS COMMUNICATION TRANSCEIVER

(71) Applicant: Ryder Electronics (Xinfeng)Ltd., GanZhou (CN)

(72) Inventor: Kip Yuan, Zhuhai (CN)

(73) Assignee: Ryder Electronics (Xinfeng)Ltd., GanZhou (CN)

( * ) Notice: Subject to any disclaimer, the term of this patent is extended or adjusted under 35 U.S.C. 154(b) by 415 days.

(21) Appl. No.: 18/428,060

(22) Filed: Jan. 31, 2024

(65) Prior Publication Data

US 2025/0112662 A1 Apr. 3, 2025

(30) Foreign Application Priority Data

Sep. 28, 2023 (CN) ......................... 202322663085.9

(51) Int. Cl.
*H04B 1/3827* (2015.01)
*H04B 1/40* (2015.01)

(52) U.S. Cl.
CPC ............. *H04B 1/3827* (2013.01); *H04B 1/40* (2013.01)

(58) Field of Classification Search
CPC ...... H04B 1/02–0346; H04B 1/08–088; H04B 1/38–40; H01H 1/58–2001/5894; H01R 12/00–91; H01R 13/00–748; H01R 24/00–86; H01R 31/00–085
See application file for complete search history.

(56) References Cited

U.S. PATENT DOCUMENTS

| | | | | |
|---|---|---|---|---|
| 2006/0084284 A1* | 4/2006 | Hsieh | ................. | H01R 13/6658 439/31 |
| 2012/0093352 A1* | 4/2012 | Huang | ..................... | H04R 5/02 381/386 |
| 2023/0048798 A1* | 2/2023 | Cai | .......................... | H04N 7/15 |

FOREIGN PATENT DOCUMENTS

| | | |
|---|---|---|
| CN | 208707622 U | 4/2019 |

* cited by examiner

*Primary Examiner* — Ronald Eisner
(74) *Attorney, Agent, or Firm* — JEEN IP LAW, LLC

(57) ABSTRACT

The present disclosure discloses a wireless communication transceiver, including a transceiver body and a plug connector rotatably connected to the transceiver body. The transceiver body is provided with an accommodation chamber, the plug connector can rotate relative to the transceiver body to be placed in or detached from the accommodation chamber so that a user can rotate and adjust the plug connector with one hand, rendering it more convenient to use and improving a user experience, at the same time, it can protect the plug connector to avoid damage caused by collision or user misoperation that may cause the plug connector to unfold, and to avoid long-term exposure of the plug connector that affects a wireless communication performance.

8 Claims, 4 Drawing Sheets

WIRELESS COMMUNICATION TRANSCEIVER

CROSS-REFERENCE TO RELATED APPLICATIONS

This application claims priority to Chinese Patent Application No. 202322663085.9, filed on Sep. 28, 2023, which is hereby incorporated by reference in its entirety.

TECHNICAL FIELD

The present disclosure relates to a transceiver, and in particular, to a wireless communication transceiver applied in the field of wireless communication.

BACKGROUND

With the development of society and the improvement of mobile communication, an application of wireless communication transceivers in people's daily life is also becoming more and more widespread, for example in source speakers, mixing consoles, power amplifiers, power amplifier, guitars, basses, and various keyboard instruments, etc.

When wireless communication transceivers in the existing technology are applied in some narrow spaces, users have to use both hands to operation them and reduced convenience. To solve the above problem, the existing technology discloses a solution where the plug connector can rotate, such as a wireless audio transceiver disclosed in a Chinese Patent (application number: 201820757659.5). However, in the existing technology, the plug connectors of wireless communication transceivers are generally directly exposed without any protective measures applied, rendering wireless communication transceivers to be prone to collision and damage. Long term exposure to the outside will affect a wireless communication effect of transceivers in some extent. At the same time, the plug connectors require a user to rotate and adjust with both hands, which is extremely inconvenient to use.

SUMMARY

In response to the problems in the existing technology mentioned above, the present disclosure provides a wireless communication transceiver, which includes a transceiver body and a plug connector rotatably connected to the transceiver body; the transceiver body is provided with an accommodation chamber, the plug connector can rotate relative to the transceiver body to be placed in the accommodation chamber or detached from the accommodation chamber. A user can rotate and adjust the plug connector with one hand, it is more convenient to use and improves a user experience. At the same time, it can protect the plug connector to avoid damage caused by collision or user misoperation that may cause the plug connector to unfold. It also prevents the plug connector from being exposed for a long time then avoiding the plug connector fake electric conduction possibility and avoiding affecting its wireless communication performance.

The technical solution adopted by the present disclosure to solve its technical problem is: a wireless communication transceiver, where the transceiver includes a transceiver body and a plug connector rotatably connected to the transceiver body. The transceiver body is provided with an accommodation chamber, the plug connector can rotate relative to the transceiver body to be placed in the accommodation chamber or detached from the accommodation chamber.

In an embodiment of the present disclosure, the accommodation chamber includes a first opening corresponding to the plug connector and a second opening for the user to finger move the plug connector.

In an embodiment of the present disclosure, the accommodation chamber is located at a position of an edge of the transceiver body.

In an embodiment of the present disclosure, a protrusion corresponding to the second opening is provided on the plug connector for the user to move the plug connector.

In an embodiment of the present disclosure, the protrusion is composed of a bottom and a top, where the bottom is fixedly connected to the protrusion, the top is fixedly connected to one side of the bottom away from the protrusion.

In an embodiment of the present disclosure, one end of the plug connector is provided with a connection portion, the transceiver body is provided with an installation groove for matching with the connection portion.

In an embodiment of the present disclosure, a rotation shaft is provided on the connection portion, a rotation hole is provided on the transceiver body for rotating and matching with the rotation shaft.

In an embodiment of the present disclosure, the transceiver body is prismatic.

In an embodiment of the present disclosure, the accommodation chamber is provided at a connection position between a first side and a second side of the transceiver body.

In an embodiment of the present disclosure, the first opening is provided on the first side of the transceiver body, the second opening is provided on the second side of the transceiver body.

The beneficial effects of the present disclosure: the present disclosure provides a wireless communication transceiver, which includes a transceiver body and a plug connector rotatably connected to the transceiver body. The transceiver body is provided with an accommodation chamber, the plug connector can rotate relative to the transceiver body to be placed in or detached from the accommodation chamber, so that a user can rotate and adjust the plug connector with one hand, it is more convenient to use, improve a user experience, and can protect the plug connector to avoid damage caused by collision or user misoperation that may cause the plug connector to unfold. It also avoids long-term exposure of the plug connector to the outside, which affects its wireless communication effect.

Figure 1:
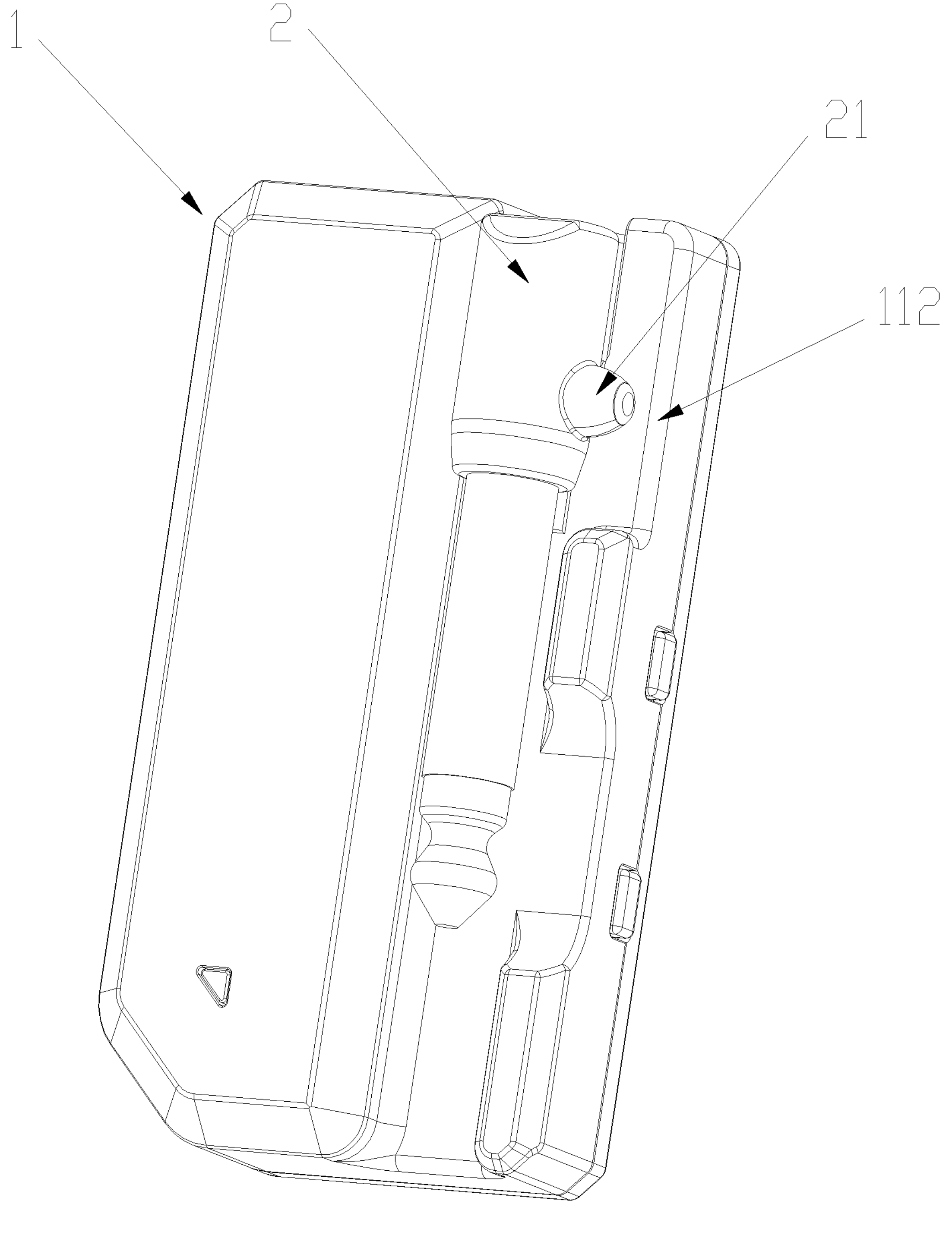
FIG. 1 is a structural schematic diagram of a wireless communication transceiver provided by the present disclosure.

Numeral reference: 1—Transceiver body; 11—Accommodation chamber; 111—First opening; 112—Second opening; 12—Installation groove; 121—Rotation hole; 2—Plug connector; 21—Protrusion; 211—Bottom; 212—Top; 22—Connection portion; 221—Rotation shaft.

DESCRIPTION OF EMBODIMENTS

In order to clarify the purpose, technical solution, and advantages of the embodiments of the present disclosure, the following will provide a clear and complete description of the technical solution of the embodiments of the present disclosure in combination with the drawings. Obviously, the described embodiments are a part of the embodiments of the present disclosure, rather than all embodiments. Based on the described embodiments of the present disclosure, all other embodiments obtained by ordinary technical personnel in the art without creative work fall within the protection scope of the present disclosure.

In the description of the present disclosure, it should be understood that terms “up”, “down”, “front”, “back”, “left”, “right”, “top”, “bottom”, “inside”, “outside”, etc. indicate that the orientation or position relationship based on the orientation or position relationship shown in the drawings is only for the convenience of describing the present disclosure and simplifying the description, rather than indicating or implying that the device or component referred to must have a specific orientation constructed and operated in a specific orientation, therefore it cannot be understood as a limitation to the present disclosure.

In the present disclosure, unless otherwise specified and limited, terms “installation”, “connection to”, “connection with”, “fixation to” and other terms should be broadly understood, for example, they can be a fixed connection, a detachable connection, or an integrated connection; it can be a mechanical connection or an electrical connection; it can be a directly connection, or a indirectly connection through an intermediate medium, or it can be an internal connection between two components. For ordinary technical personnel in this field, specific meanings of the above terms in the present disclosure can be understood based on a specific circumstance.

In the present disclosure, unless otherwise specified and limited, a first feature may include a direct contact between the first and second features, or a direct contact between the first and second features through other features between them. Moreover, the first feature “above”, “on”, and “up” the second feature include the first feature directly above and diagonally above the second feature, or simply indicating that the first feature is horizontally higher than the second feature. The first feature “below”, “down”, and “underneath” include the first feature directly below and diagonally below the second feature, or simply indicate that a horizontal height of the first feature is less than that of the second feature.

Unless otherwise defined, the technical or scientific terms used here shall have the usual meaning understood by those with general skills in the field to which the present disclosure belongs. Terms “first”, “second”, and similar terms used in the present disclosure and claims do not indicate any order, quantity, or importance, but are only used to distinguish different components. Similarly, words like “one” or “a/an” do not indicate a quantity limit, but rather indicate the existence of at least one.

Figure 2:
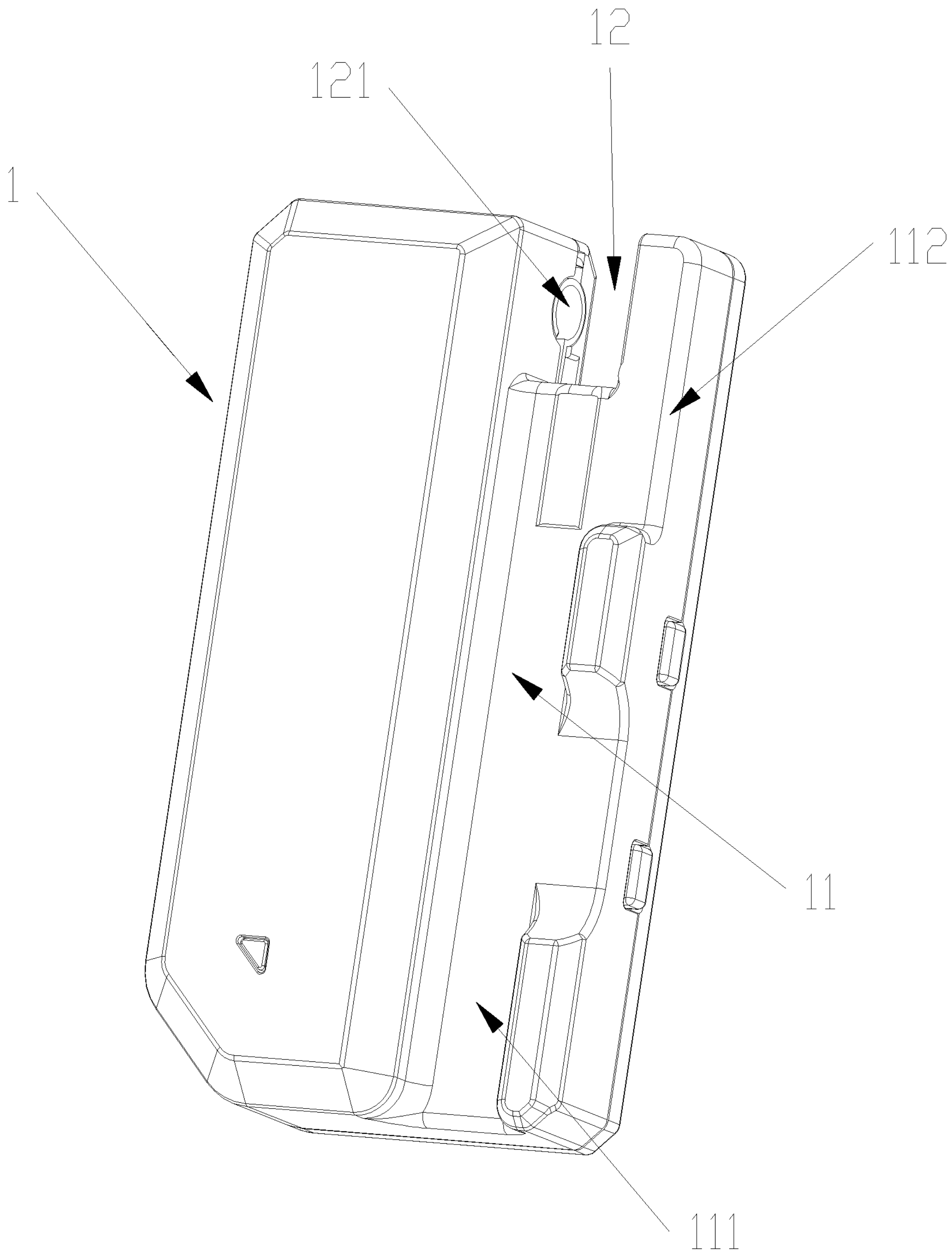
FIG. 2 is a structural schematic diagram of the transceiver body provided by the present disclosure.
Figure 3:
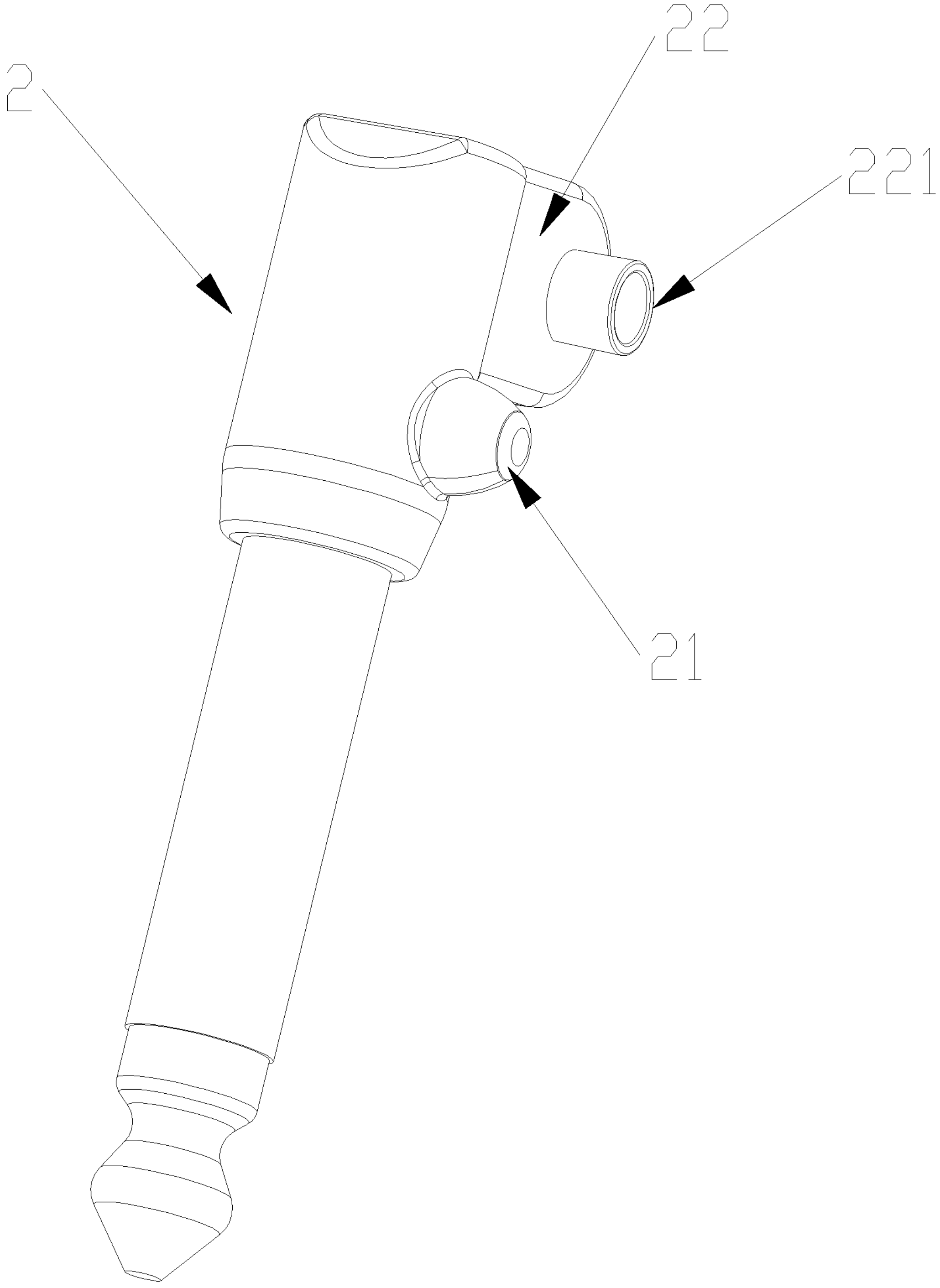
FIG. 3 is a structural schematic diagram of a plug connector provided by the present disclosure.
Figure 4:
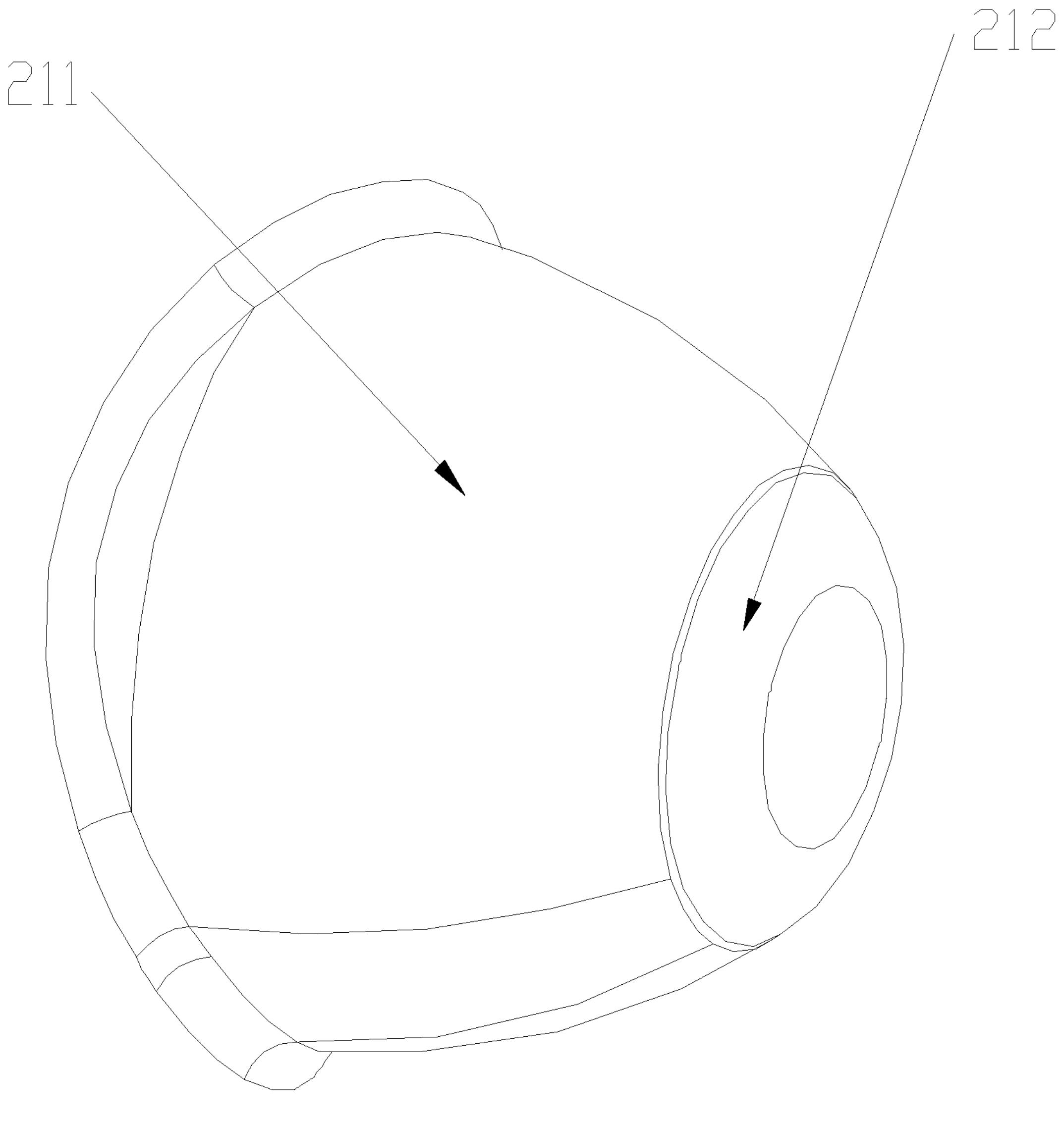
FIG. 4 is a structural schematic diagram of a protrusion provided by the present disclosure.

Please refer to FIGS. 1-4, a wireless communication transceiver provided by the present disclosure.

In this embodiment, a wireless communication transceiver includes a transceiver body 1 and a plug connector 2 rotationally connected to the transceiver body 1. The transceiver body 1 is provided with an accommodation chamber 11, one end of the plug connector 2 is provided with a connection portion 22. The transceiver body 1 is provided with an installation groove 12 for matching with the connection portion 22, a rotation shaft 221 is provided on the connection portion 22. The transceiver body 1 is provided with a rotation hole 121 for rotating and matching with the rotation shaft 221. The plug connector 2 can rotate relative to the transceiver body 1 through the rotation shaft 221 and the rotation hole 121 to be placed in or detached from the accommodation chamber 11, thereby protecting the plug connector 2 from collision and damage, and avoiding a long-term exposure of the plug connector 2 to the outside, which affects its wireless communication effect.

In this embodiment, a diameter specification of the plug connector 2 is 6.35 mm. Of course, the diameter specification of the plug connector 2 can also be set to other specifications such as 3.5 mm. Two opposite sides of the installation groove 12 are both hollowed out, allowing the plug connector 2 to rotate at a larger angle along the rotation shaft 221, avoiding difficulties in using the wireless communication transceiver in some narrow spaces due to an inconsistent direction between the plug connector and the plug hole.

In this embodiment, the accommodation chamber 11 includes a first opening 111 and a second opening 112 corresponding to the plug connector 2. A user can pass their fingers through the second opening 112 to move the plug connector 2, so that the plug connector 2 can rotate relative to the transceiver body 1 through the first opening 111.

As a preferred solution rather than a limitation, a protrusion 21 corresponding to the second opening 112 is provided on the plug connector 2, the protrusion 21 can facilitate the user to rotate the plug connector 2 by fingers moving it. In this embodiment, the protrusion 21 is composed of a bottom 211 and a top 212, the bottom 211 is fixedly connected to the protrusion 21. The top 212 is fixedly connected to one side of the bottom 211 away from the protrusion 21. As a preferred solution rather than a limitation, the bottom 211 is in a cylindrical shape, and the top 212 is in a conical shape. A bottom surface of the conical-shaped top 211 is fixedly connected to the bottom 212. A friction force between the user’s fingers and the protrusion 21 can be increased through the top 211, rendering it easier for the user to adjust and rotate the plug connector 2 through his fingers. Of course, the bottom 211 may be in a prism shape and the top 212 in a pyramid or pyramid shape to achieve a same effect as the present disclosure.

In this embodiment, the accommodation chamber 11 is provided at a position of an edge of the transceiver body 1. As a preferred solution rather than a limitation, the transceiver body 1 is prismatic in shape. In this embodiment, the transceiver body 1 is in a quadrangular shape, which can also be in other shapes such as hexagonal prism, octagonal prism, cylindrical, etc. The accommodation chamber 11 is provided at a connection position between a first side and a second side of the transceiver body 1. The first opening 111 is provided on the first side of the transceiver body 1, the second opening 112 is provided on the second side of the transceiver body 1. Through the above settings, the user can rotate and adjust the plug connector 2 with one hand, rendering it more convenient to use and improving a user experience.

The drawings of this product are for a right-hand use, but the present disclosure also includes a left-hand use, and its related structural symmetry is similarly modified, all of which are included in the present disclosure.

As a preferred solution rather than a limitation, the transceiver body 1 is further provided with a battery for supplying power to the wireless communication transceiver. The accommodation chamber 11 is provided at a position of an edge of the transceiver body 1, which can also reserve more space for the battery without increasing a volume of the transceiver body 1 to store a larger capacity battery, thereby improving an endurance of the wireless communication transceiver.

In this embodiment, a wireless communication transceiver is provided, which includes a transceiver body 1 and a plug connector 2 rotationally connected to the transceiver body 1. The transceiver body 1 is provided with an accommodation chamber 11, the plug connector 2 can be rotationally installed in the accommodation chamber 11 relative to the transceiver body 1. Therefore, a user can rotate and adjust the plug connector 2 with one hand, rendering it more convenient to use and improving a user experience. At the same time, it can protect the plug connector 2 from collision and damage, or user misoperation that may cause the plug connector 2 to unfold, and prevent the plug connector 2 from being exposed for a long time and affecting its wireless communication performance.

It should be understood that the application of the present disclosure is not limited to the above embodiments. For ordinary technical personnel in this field, improvements or transformations can be made according to the above description. All these improvements and transformations should fall within the protection scope of the claims attached to the present disclosure.

What is claimed is:

1. A wireless communication transceiver, comprising: a transceiver body and a plug connector rotatably connected to the transceiver body, wherein the transceiver body is provided with an accommodation chamber, the plug connector is configured to rotate relative to the transceiver body to be placed in or detached from the accommodation chamber;

wherein a protrusion corresponding to a second opening is provided on the plug connector for a user to move the plug connector;

wherein the protrusion is composed of a bottom and a top, the bottom is fixedly connected to the protrusion, the top is fixedly connected to one side of the bottom away from the protrusion;

wherein the bottom is cylindrical or prismatic, and the top is conical, pyramidal or frustum shape.

2. The wireless communication transceiver according to claim 1, wherein the accommodation chamber comprises a first opening corresponding to the plug connector and the second opening for the user to finger move the plug connector.

3. The wireless communication transceiver according to claim 1, wherein the accommodation chamber is located at a position of an edge of the transceiver body.

4. The wireless communication transceiver according to claim 1, wherein one end of the plug connector is provided with a connection portion, the transceiver body is provided with an installation groove for matching with the connection portion.

5. The wireless communication transceiver according to claim 1, wherein a rotation shaft (221) is provided on a connection portion, a rotation hole is provided on the transceiver body for rotating and matching with the rotation shaft.

6. The wireless communication transceiver according to claim 3, wherein the transceiver body is prismatic.

7. The wireless communication transceiver according to claim 6, wherein the accommodation chamber is provided at a connection position between a first side and a second side of the transceiver body.

8. The wireless communication transceiver according to claim 7, wherein the first opening is provided on the first side of the transceiver body, the second opening is provided on the second side of the transceiver body.

* * * * *